Sept. 27, 1949.　　G. B. RHEINFRANK, JR., ET AL　　2,482,798
AIRCRAFT WING AND METHOD OF MANUFACTURE
Filed Feb. 27, 1946　　9 Sheets-Sheet 7

INVENTORS
GEORGE B. RHEINFRANK JR.
WAYNE A. NORMAN
BY
ATTORNEYS

Sept. 27, 1949.   G. B. RHEINFRANK, JR., ET AL   2,482,798
AIRCRAFT WING AND METHOD OF MANUFACTURE
Filed Feb. 27, 1946   9 Sheets-Sheet 8

INVENTORS
GEORGE B. RHEINFRANK JR.
WAYNE A. NORMAN
BY
ATTORNEYS

Patented Sept. 27, 1949

2,482,798

UNITED STATES PATENT OFFICE 2,482,798

AIRCRAFT WING AND METHOD OF MANUFACTURE

George B. Rheinfrank, Jr., Perrysburg, Ohio, and Wayne A. Norman, Dubuque, Iowa

Application February 27, 1946, Serial No. 650,592

18 Claims. (Cl. 244—123)

(Granted under the act of March 3, 1883, as amended April 30, 1928; 370 O. G. 757)

The invention described herein may be manufactured and used by or for the Government for governmental purposes without the payment to us of any royalty thereon.

The present invention relates to a novel aircraft wing structure and to a method of making the wing.

In the past aircraft wing constructions have usually been classified in three main groups, as follows: (1) all metal, (2) all wood, and (3) wood or metal framing covered with a woven fabric. Each type of wing possesses its own peculiarities and drawbacks, as well as special fields of use. In the all metal or all wood constructions the outer skin is generally relied on to carry considerable portions of the load. However, in all metal construction the skin has low resistance to bending or twisting moments, even though its tensile strength may be very high. The metal skin is also not adapted to resist any large compressive force without buckling. A plywood skin as applied in the all wood constructions is superior to sheet metal in compression or in bending, at least for equal weight per unit of area, but the best quality veneer sheets are costly and require expert handling and assembly technique. The third group mentioned above in which a wood or metal frame is covered with a fabric is used mostly in the more inexpensive aircraft, and differs from the other two groups in that the fabric or skin is not required to lend any strength to the framing, serving only to inclose the framing and thus present an unbroken airfoil surface.

The principal object of the present invention is to provide an aircraft wing embodying a stressed skin of laminated construction and having combined therewith a particular arrangement of structural members adhesively bonded to the laminated skin.

It is a related object of the present invention to provide a stressed skin wing structure in which the skin or shell comprises a low density core faced on each side with a plurality of layers of cloth or fabric impregnated with a low-pressure thermosetting resin and in which the layers are bonded to the core and to each other by means of the fabric impregnating resin.

Another important object of the invention is to provide a laminated wing structure of the stressed skin or monocoque type which will combine advantages of all metal and all wood constructions, and at the same time provide a wing which will be adapted for quantity production at comparatively low cost.

Ancillary to the above stated objects it is an object of the invention to provide a novel method of making a stressed skin wing of laminated construction having spaced stiffeners associated with the skin and having spar retaining means also associated with the skin structure.

The subject matter of the present invention forms improvements on and a continuation of developments reported in Modern Plastics of May 1944 under the titles "Development of glass-reinforced low-pressure plastics for aircraft" (pages 89 to 93) by Colonel Paul H. Kemmer and "Application of glass laminates to aircraft" (pages 94 to 99) by Capt. George B. Rheinfrank and Lieut. Wayne A. Norman, and further disclosed and claimed in the copending application of George B. Rheinfrank, Serial No. 492,309 filed June 25, 1943, now Patent No. 2,414,125.

In the present case the wing structure makes use of a laminated material similar to that disclosed in the prior publications and application but the invention is concerned with making it feasible to use the material in a wing construction, by providing means to combine the laminated material with laminated elements adapted to support and adhesively retain a plurality of reinforcing members within a hollow wing. The invention also contemplates the use of a laminated construction for the reinforcing members, and further contemplates means to rigidly attach the completed wing to the aircraft.

The above and other objects of the invention will become apparent upon reading the following detailed description in conjunction with the drawings, in which:

Fig. 3 is a perspective view of the wing shells in spaced relation but with the upper shell being lowered into assembled relation with respect to the lower shell.

The aircraft wing of the present invention comprises an upper laminated shell and a lower laminated shell each reinforced by ribs and of complementary shape for joining at their marginal edges to form a complete hollow wing. The two shells are also joined by spars or stringers extending longitudinally of the wing. Noting Fig. 3 the lower shell is designated 1, the upper shell is 2 and the shells are braced and held together by lengthwise members or spars, while each shell is reinforced crosswise by ribs associated with each separate shell. These are the main components of the wing and when completely assembled and adhesively bonded combine to form a rigid and unitary wing structure.

Materials of construction

The laminated shells forming the walls of the present monocoque wing structure and also the structural members such as spars, ribs and box flanges are in each case built up of two spaced layers of laminated glass cloth adhesively bonded to a core structure. To illustrate the materials and their manner of assembly into a wall or shell structure attention is directed to Fig. 14. The wall structure as here shown may be used to form the spaced wing shells, and includes the lower layer or skin, $a$, upper layer or skin $b$ and core layer $c$. The upper and lower layers are each formed of a plurality of glass cloth sheets separately impregnated with a thermosetting resin in syrup form and are laid up in the relation shown with respect to a core layer. The core in this example is made of resin impregnated glass cloth wrapped around strips of cellular cellulose acetate, the strips and skin layers being bonded under heat and pressure after assembly, the wrapped strips forming wall stiffening elements in the completed assembly.

The glass cloth employed is preferably a fine grade made of yarn formed from continuous glass fibers, and in the uncoated state the cloth has a thickness of only about 0.003 of an inch. It is understood that other fabrics may be substituted if desired, as for instance cloth made of fine wire, linen, ramie or cotton fibers or of any known fibers, natural or synthetic, and the finished fabric may be of any suitable weight or grade. Also it may sometimes be desirable to alternate different plys of fabric such as glass cloth and linen, or glass cloth and ramie cloth.

The resin impregnating and bonding material employed may be of any known type of low pressure thermosetting resin preferably setting to a final hardened stage by heating to a temperature not over 350° F. Examples which may be used are phenol formaldehyde, urea formaldehyde, carbamide formaldehyde or any of the heat setting styrene or melamine resins.

The core strips as above described may be formed with any lightweight core material such as cellular cellulose acetate, balsa wood, basswood or cork. Another material available is called "cellular glass" or "honeycomb glass" and comprises plastic impregnated glass cloth or fabric corrugated and combined with a number of similar sheets in plastic bonded relation. An advantage in the use of cellular cellulose acetate is the possibility of selecting the density to suit the requirements of local stresses. In making the present wing it is preferred to use a density of about 7 to 8 pounds per cubic foot in this core material.

Figure 14:
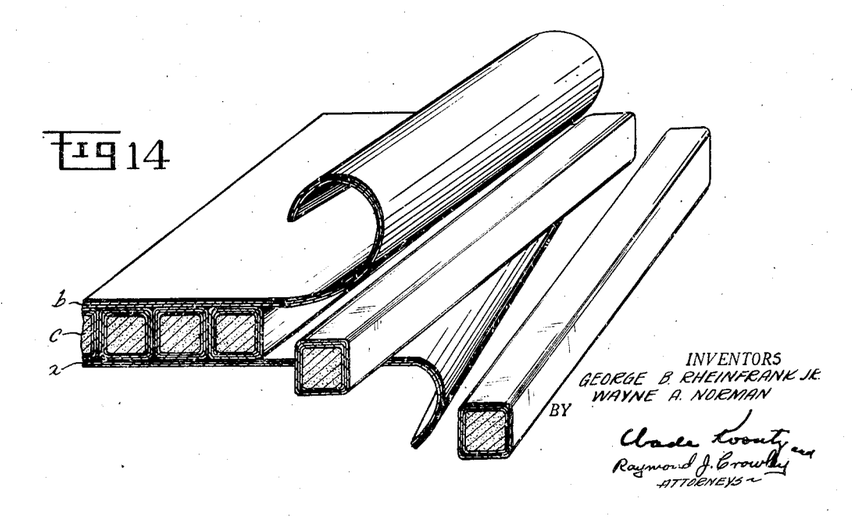
Fig. 14 is a cross sectional view showing the manner of assembling a wall structure similar to that forming the upper and lower wing shells.

In making the sandwich-like material of Fig. 14 or any similar structure the number of cloth layers may vary widely, nor can the average number be illustrated unless drawn to much enlarged scale. As the layers and adjacent elements are bonded together the cloth becomes quite hard and stiff, so that the finished material is of boardlike character and takes on a very smooth surface finish if molded in contact with surface members having a similar finish.

Wing structure

Having described the materials employed in the wing and their use in forming a wall or shell, the present wing construction will now be described in detail. As shown in bottom plan view (Fig. 1) the present monocoque wing comprises a tapering structure widest at the root section R and having a leading edge L, trailing edge T, and a landing-light recess or box B. The trailing edge is divided lengthwise into two sections each coextensive in length with two adjoining wing bays. The section nearer the root is eventually fitted with a wing flap while the outer section is built to receive an aileron. A number of inspection openings I are provided in the lower wing shell, to give access to cables and wires. The outer free end E is built to receive a wing tip when completed, this added element being indicated at C in Fig. 2. It is noted also that the wing length is usually termed the span, the width at any point being termed the chord.

Figure 1:
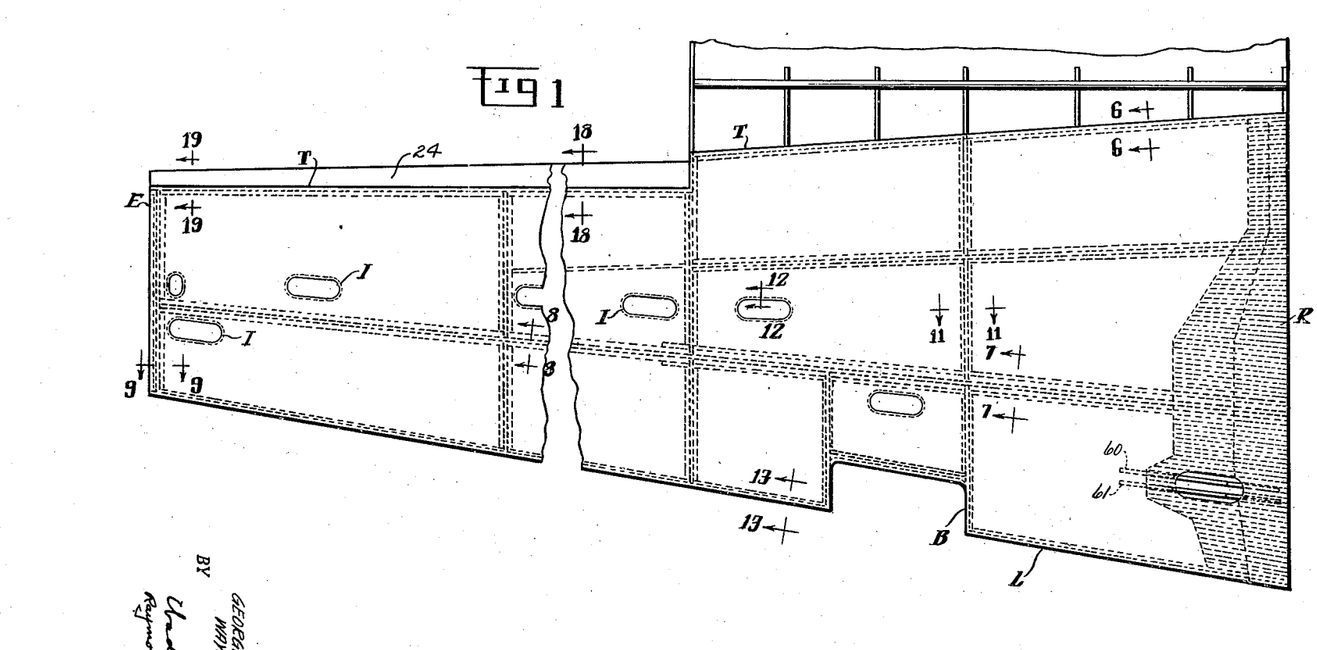
Fig. 1 is a bottom plan view of the completed wing structure of the present invention.
Figure 2:
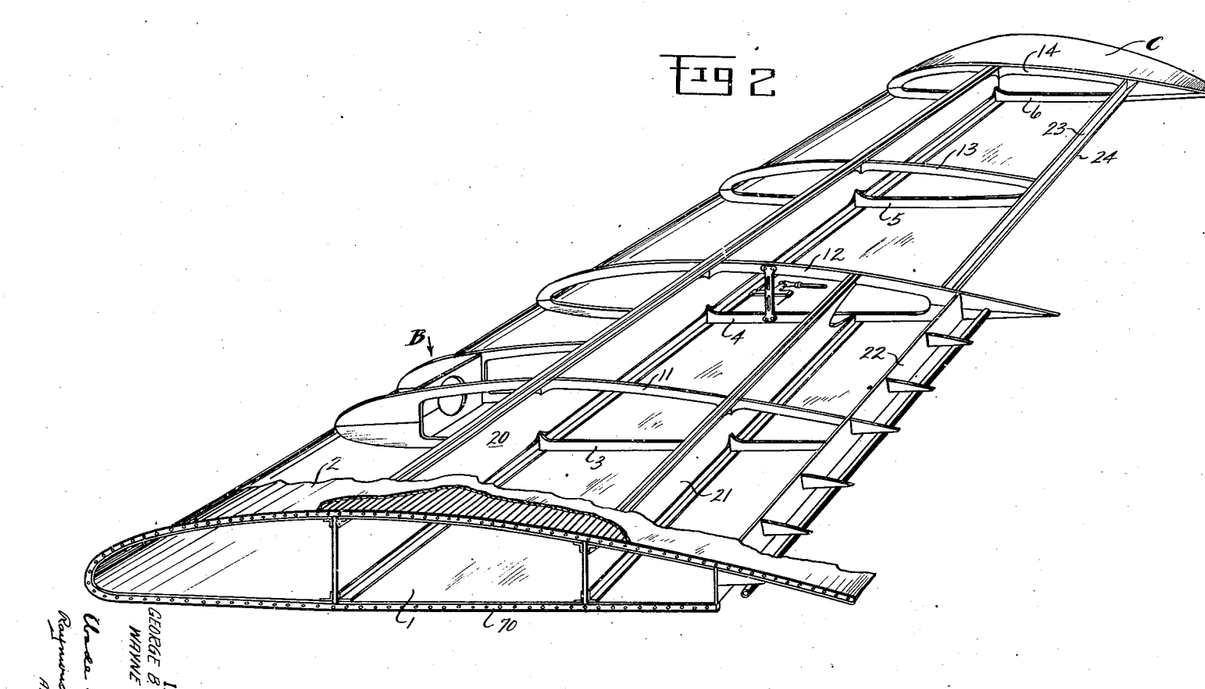
Fig. 2 is a perspective view of the assembled wing, the upper skin being mostly cut away to show the interior structural arrangement.

Referring to Figs. 2 and 3 the wing structure is shown as comprising a lower shell 1 and an upper shell 2, which form a complete monocoque wing when assembled with the ribs and spars, as shown best in Fig. 2. Each individual shell includes an outer skin, a core layer and an inner skin assembled in bonded relation. Each of these shells is a composite structure similar to that described above in connection with Fig. 14. In making the lower shell 1 it is noted that flat surfaces predominate because of the cross sectional shape of the airfoil. Therefore the core elements between the skin layers may be in the form of slabs of cellular material wrapped with plastic impregnated fabric, or inserted between the skin sheets without wrapping especially in the outer wing bays where the need for stiffening of the shells is not so imperative. Where the wing shells have curved surfaces the use of narrow core elements, about one inch wide, permits the laminated shell to take on a smoothly curved shape. It should be understood that all the core elements, whether wrapped to form wall stiffening elements or merely in the form of cellular strips or slabs, extend spanwise of the wing except those elements forming rib flanges to be described below. In the preferred construction the core elements are cut to even length between the ribs, although the wing spar flanges which also form shell core material extend through several bays. The use of wrapped core elements or stiffening elements is preferably limited to the shells in a portion of the root bay where stress concentration is high, this portion being indicated in Fig. 1 by the series of parallel dotted lines. The core elements in this bay even though only partially wrapped may be in the form of continuous strips extending the full length of the bay. In the outer bays the shell core comprises merely strips and slabs of cellular material bonded to the skins. Whether the material is of cellular cellulose acetate board, wood, or "honeycomb glass" the bond with the skins appears to be very tenacious. This low density filler material may be laid up in random lengths if desired but is preferably cut to fit between the rib flanges, that is the same length as the respective wing bays.

In each adjacent bay the thickness of the cellular sheet material varies, so that the shell thickness is graduated from a maximum in the root bay to a minimum in the wing tip bay. In one example a wing having a chord of seven and a half feet at the root and a span of fifteen and a half feet embodied cellular material cut from sheets which varied in thickness from 0.525 of an inch for the root bay down to 0.3 of an inch in the wing tip bay.

Figure 4:
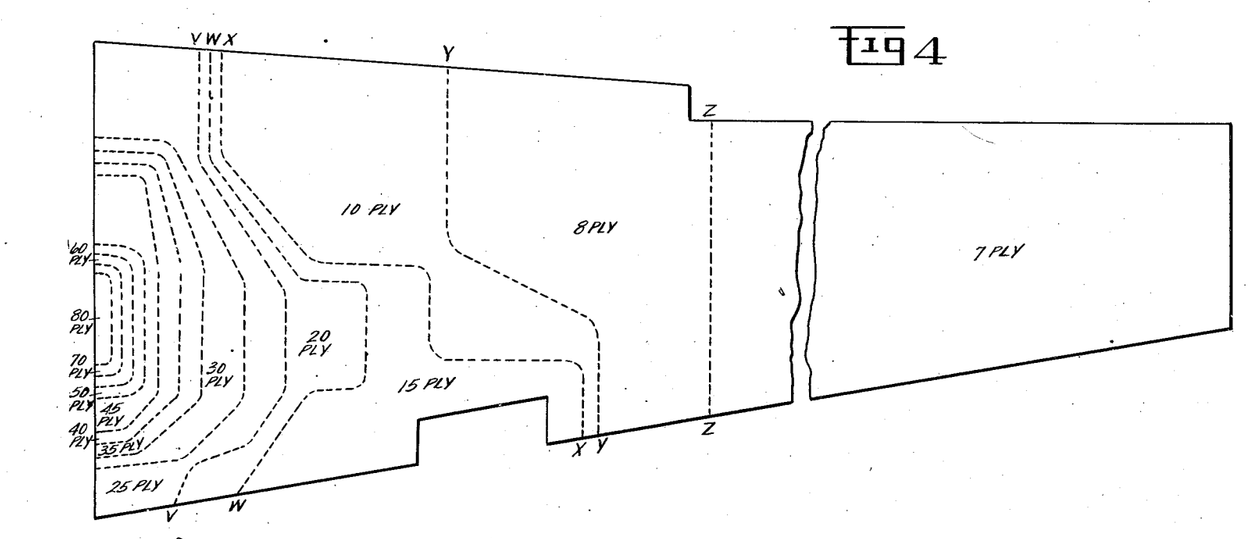
Fig. 4 is a plan view of the laminated skin forming the lower or outer side of the lower wing shell.
Figure 5:
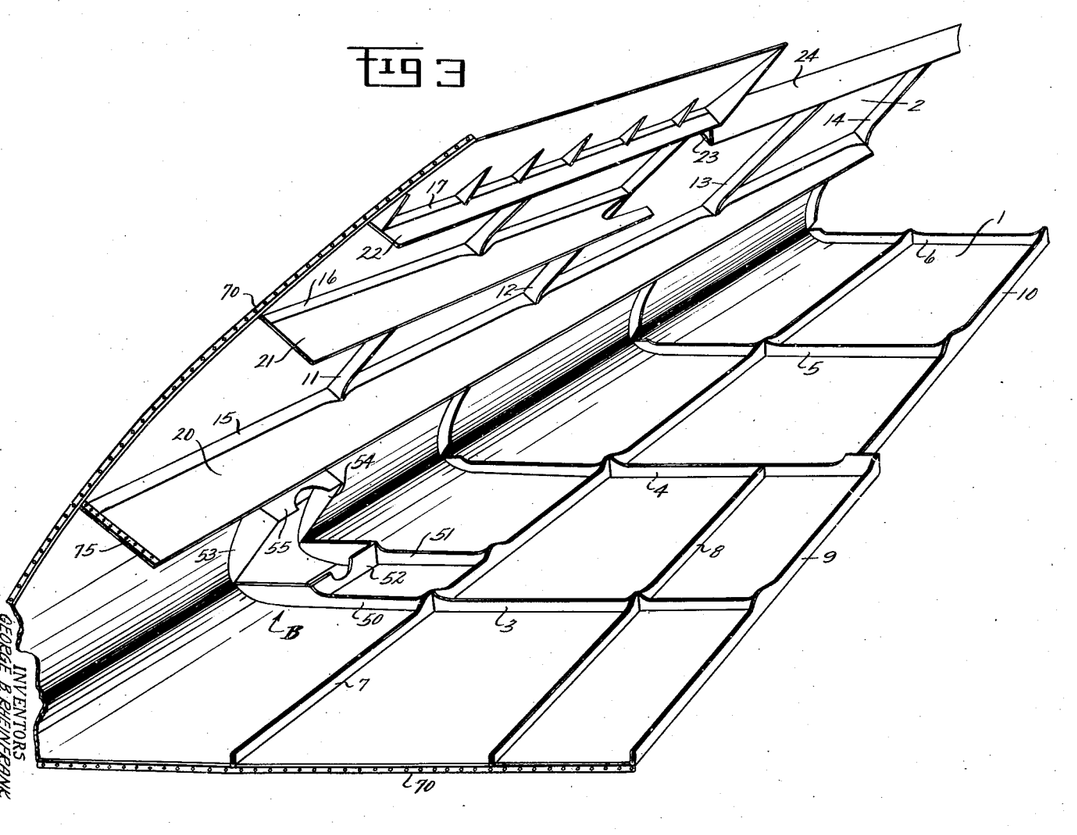
Fig. 5 is a plan view of the laminated skin forming the upper or outer side of the upper wing shell.

The skin which forms each face of the wing shells is of graduated thickness, with the laminations cut to predetermined outlines in such a way as to provide strength where it is most needed. This feature is best illustrated by reference to Figs. 4 and 5, showing in plan the lower or outer skin of the lower shell and the upper or outer skin of the upper shell, respectively. Thus the skin of Fig. 4 comprises seven laminations on the outer face covering one whole side of the wing, one lamination thereunder extending to the line Z—Z, two more laminations extending to line Y—Y, five more laminations extending to line X—X, five more extending to line W—W five more extending to line V—V and so on to make up the total lamination thicknesses as indicated for each succeeding zone in the drawings. This graduation of thickness is not carried to such an extent in making the inside skins of each wing shell. The general outline is maintained as in Figs. 4 and 5 but after twenty thicknesses of fabric have been attained no further laminations are added, unless the wing loading is exceptionally high. These inside skins are not illustrated in plan since they differ from the outer skins only in the extent of lamination build-up near the wing root, as noted above. In spite of the numerous laminations indicated in Figs. 4 and 5 the total thicknesses are not very great when the material is fully compressed and bonded, so that the variation from one zone to the next does not prevent the core layer from becoming well bonded to the skin.

Referring again to Fig. 3 the wing shells will be seen to carry ribs 3 to 6 and 11 to 14, and also the spar supporting channels 7 to 10 and 15 to 18. The spars 20 to 23 are shown in connection with the upper wing shell and in conformity with good wing design the spars have outwardly tapered webs. According to the present inventive concept the ribs and spars are combined with the wing shells 1 and 2 in a particular and appropriate manner to result in an efficient and well integrated structure.

Figures 6, 7:
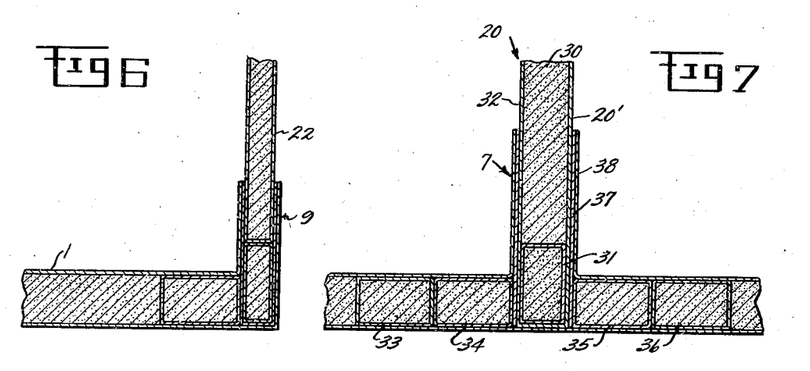
Figs. 6, 7, 8 and 9 are cross sectional views of joint details taken on lines 6—6, 7—7, 8—8 and 9—9 of Fig. 1.
Figures 8, 9:
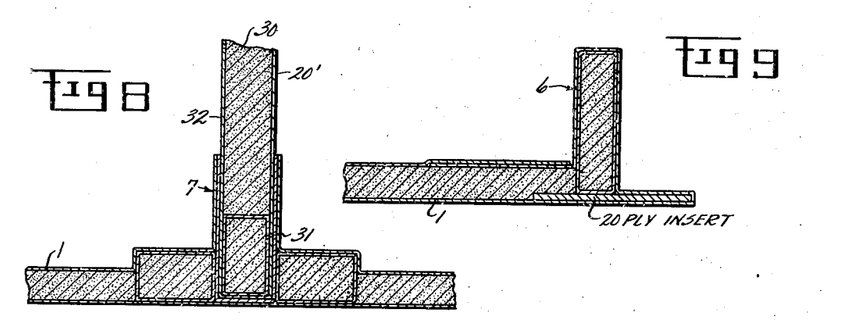

Considering first the spar construction and arrangement, reference is made to Fig. 3 to show the main spars 20 and 21 and the auxiliary or false spars 22 and 23. These longitudinal members provide by means of their deep shear webs secured to the wing shells, an internally reinforced wing structure of the monocoque type which will withstand high bending and shear stress. The spar details are best shown in Figs. 7 and 8. Noting Fig. 7 in particular the spar 20 comprises a spar web 20' made up from a core slab 30, core edge element 31 and core covering 32. The core edge element 31 is separately wrapped with resin impregnated cloth and enclosed with a core slab 30 by means of the fabric covering which is preferably wrapped around the whole core web. An additional core element similar to element 31 is also included along the opposite longitudinal edge of the web. The web 20' is adhesively joined to the spar flange elements 33 and 36 situated between the shell skins, these flange elements being made of wrapped cellular material also. The web supporting channel comprises a U-shaped cloth insert 37 of about ten laminations of resin impregnated cloth plus the upstanding cloth layers 38 which form integral continuations or web portions of the inside shell skin. With the parts assembled and bonded as shown the spar 20 of I-shaped cross section comprises a web 20' and upper and lower spar flanges forming portions of the wing shells. The flanges being located between the wing shell skins are of course bonded thereto, while portions of the skin on each side of the spar are turned up and bonded to the spar web. In the same way the other spars 21, 22 and 23 are secured to the wing shells, and if desired a series of laminated gussets are set at intervals in the angle between the spars 22 and 23 and the trailing edge portions of upper shell 2. Extending downwardly from the rear edge of the upper wing shell there is a curved fairing sheet 24 of laminated cloth (20 ply) the lower edge of which is bonded to the adjacent spar web. In the complete wing the aileron is rotatably mounted adjacent to the fairing sheet 24. As shown clearly by Figs. 2 and 3 the upper wing shell extends all the way to the trailing edge at least in the two inner bays, and the pocket formed by the upper shell and the auxiliary spar 22 receives the customary wing flap.

Figures 11, 12, 13:
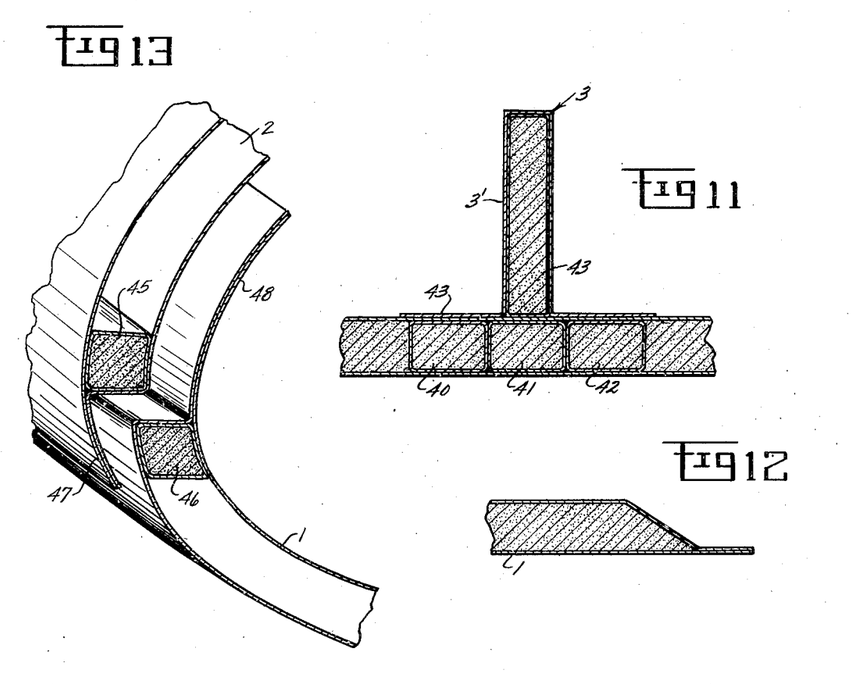
Figs. 11, 12 and 13 are cross sectional detail views taken on lines 11—11, 12—12 and 13—13 of Fig. 1.

Considering now the ribs or transverse shell reinforcing members which extend chordwise between the spars, it will be noted in Fig. 11 the web 3' of rib 3 is located in contacting alignment with a shell core element 41 flanked on either side by another core element 40 or 42. These core elements extend across the wing shells between the spar flanges at about a right angle to the direction of the spar flanges and the core elements of the shells within the wing bays. Like other of the shell core elements and like the spar flanges, the elements 40 to 42 comprise strips of cellular board material wrapped with five to ten laminations of resin impregnated fabric. Until set under proper heat treatment these wrapped strips may be laid on curved surfaces without any difficulty. The same fabric covering is applied to the web 3' of rib 3 and to each similar web. To further secure the web 3' in the position shown, a layer 43 of about ten laminations of fabric is used to enclose the web, with the side edges of the fabric smoothed down and bonded to the inside skin.

The core elements 40 to 42 extending between the spars form in effect and in fact intercostal rib flanges located between the outer and inner shell skins, the complete rib comprising the web and flanges being of T-shaped cross sectional shape. Thus in the present wing shells having a substantial core layer, the built-up and spar structures are easily combined with the shells, since the rib and spar flanges formed of wrapped cellular material also serve to provide certain portions of the shell core and are held in assembled relation on the wing by the shell skins and other binding sheets to form a unitary wing structure after heat and pressure treatment. Also at the intersection of rib and spar webs it is desirable to place binding sheets formed from small flat squares of laminated fabric cut half-way in from the middle of one edge, then formed into three planar sections at right angles to each other like the corner of a box.

The two wing shells are held in assembled complementary relation by the spars and by the leading edge joint shown in detail in Fig. 13. In this joint the upper wing skins are brought down and overlapped on the outside of the lower shell as shown at 47, while the abutting edges of the shells are formed around the wrapped core elements 45 and 46. The shells are not shown as filled with core elements but these elements in the unwrapped condition are used of course.

To provide a space for the landinglight a box B is built into the leading edge as shown in Figs. 2 and 3 and is formed of side members 50 and 51 on the lower shell joined by member 52 these all being of laminated fabric over cellular cellulose acetate or other core elements cut to the outlines shown. Similarly the upper half of the box is made from side wall members 53 and 54 joined by wall 55. While this form of light housing is practical, a preferred form of light in the present wing comprises a retractable lamp housing which may extend below the wing and also may be retracted into the wing through an aperture. When retracted the lamp housing fits flush within the aperture, which is provided in the lower wing shell.

Figure 10:
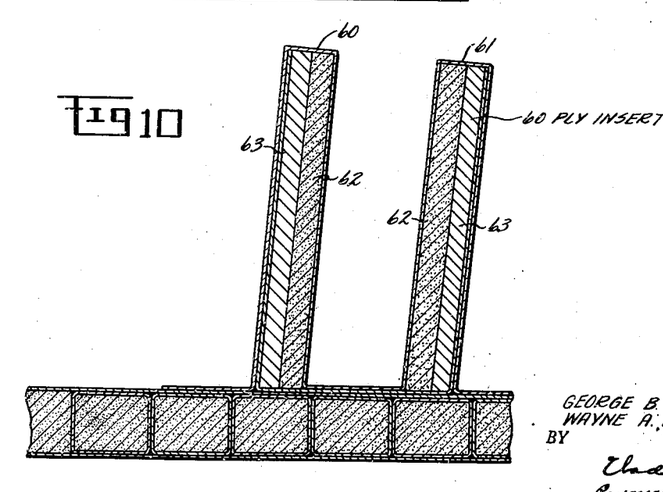
Fig. 10 is a cross sectional view to show the landing gear supporting flanges carried by the upper wing shell interiorly of the wing.

Referring to Figs. 1 and 10 the landing gear attaching flanges 60 and 61 will be noted and their manner of attachment to the upper wing shell 2 will be noted in Fig. 10. The flanges are of built up section comprising a layer of cellular material 62 and a layer of laminated fabric (60 ply) 63. By the use of fabric applied as shown in Fig. 10 these flanges are held in place, after being preformed under heat and pressure.

Figures 18, 20:
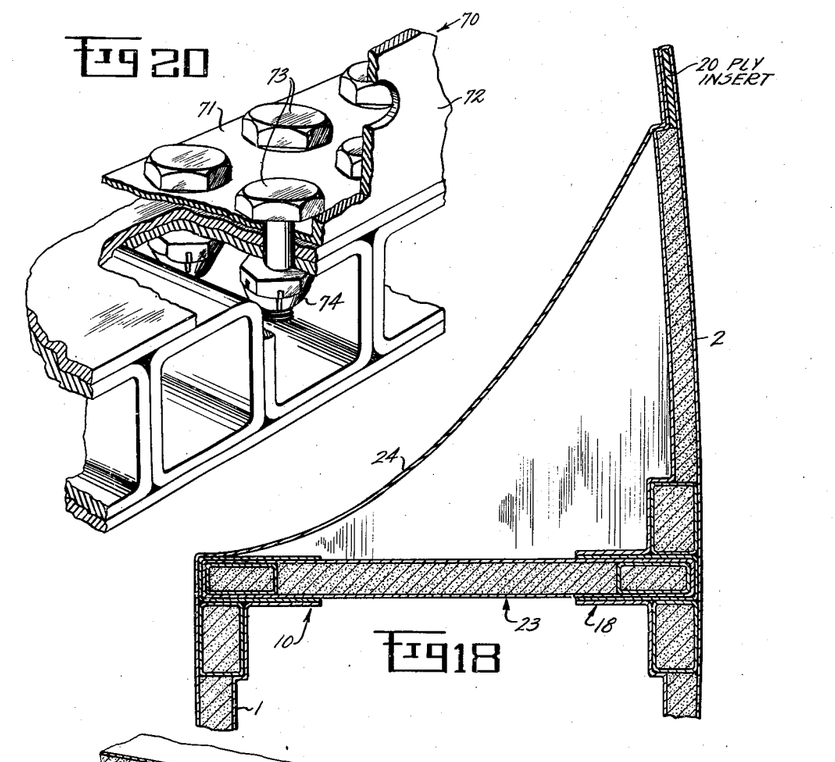
Figs. 18 and 19 are cross sectional views of joint details taken on lines 18—18 and 19—19 of Fig. 1.
Fig. 20 is a fragmentary perspective view of an upper portion of the wing adjacent the wing root to show the wing attaching means.
Figure 19:
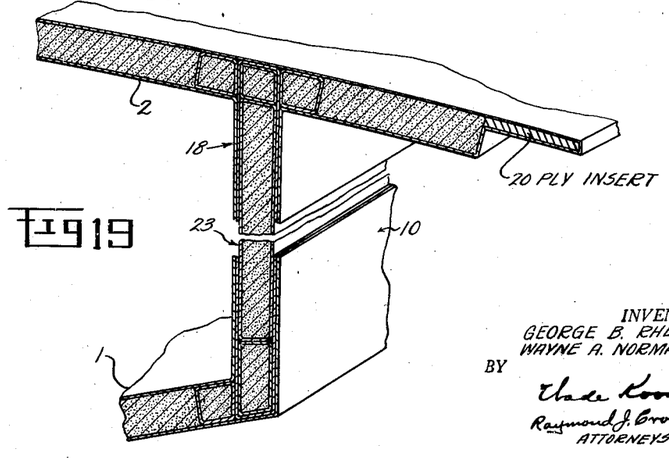

An attaching means is provided at the root of the wing, and as shown in Figs. 2 and 3 comprises a metallic member 70 of angular cross section. The member is formed to the wing contour and the base flange 71 is bolted to the wing shells by first cleaning the cellular material out of the shell stiffening elements and then applying screws 73 through the flange 71 and through shell skins and core wrappings (see Fig. 20). Nut elements 74 are threaded onto screws 73 as shown. The other member flange 72 is provided with bolt receiving openings to attach the wing to the aircraft fuselage. Another member 75 of angular cross section is used to hold the spar 20 connected to the fuselage.

Method of manufacture

Figure 15:
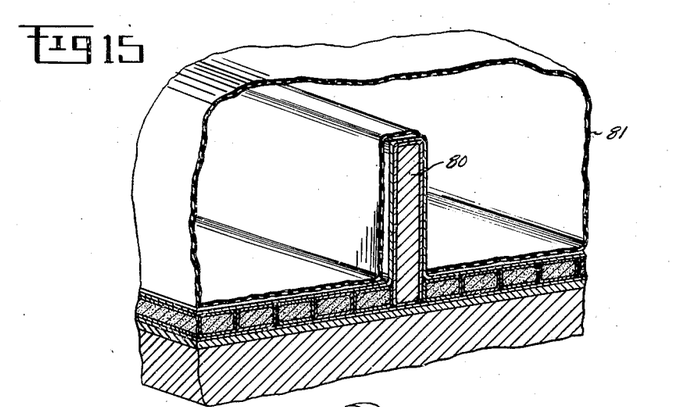
Figs. 15, 16 and 17 are cross sectional views of one wing shell taken across a spar connection and showing the shell in three stages of manufacture.

In making up the wing structure as above described the separate shells are each formed in hollow molds having curved inner surfaces like that desired in the finished shells. The outer skin is first applied within the mold and built up to the desired thicknesses directly on the mold surfaces. Then to form the spar supporting channels a plurality of metal bars 80 are wrapped with resin impregnated fabric and mounted on the inner side of the outer skin by several screws passing clear through the bars edgewise, and into the mold. The wrapped bars 80 will then stand as shown in Fig. 15, after which spar flange elements are laid on each side thereof against the outer skin. If access openings are to be provided in the shell it is necessary to lay in frame members of cellular sheet material to define the openings. The next step is that of placing the rib flanges chordwise of the wing shell, these flanges extending between and in abutment with the spar flanges. The core of the shell may then be built up from strips and slabs of cellular material according to the arrangement above described, following which the inside skin is applied and carefully smoothed over the core elements, rib flanges and fabric covered metal inserts located to form the spar supporting flanges. As a final step the rib elements are set in place on the inner skin and covered with securing strips of laminated fabric, as described in connection with Fig. 11.

The assembled shell is now ready to be cured under heat and pressure by the use of an air filled bag 81 (see Fig. 15), which is confined by the use of a strong non-stretchable fabric covering adapted to be tacked down to the edges of the mold. Fig. 15 is merely a diagrammatic showing of the air bag to show the formation of the spar reinforcing channels, it being understood that the bag should extend clear across the mold and shell contained therein. For use with a molded wing shell bonded by low pressure thermosetting resin it is preferred to apply pressure to the shell by employing a flexible diaphragm, which may be made of a transparent plastic sheet material adapted to be heat-sealed at the edges of the mold. Thus the diaphragm may be made airtight where it meets the mold edges and is then evacuated to cause the pressure of the atmosphere to be exerted in bonding the shell. With fluid pressure exerted evenly on the shell by the above described or any other means, the mold is then placed in a curing oven and the shell becomes cured and hardened by the application of moderate heat. For numerous resins available at this time the heat need not be very great, temperatures of around 300° F. being ample for most purposes. The pressures applied may be on the order of two to ten pounds per square inch for many low pressure resins now available.

Figure 16:
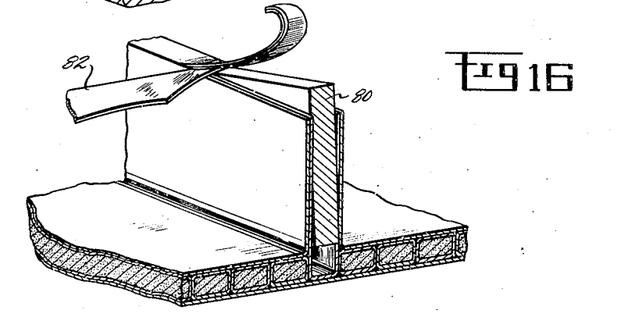
Figure 17:
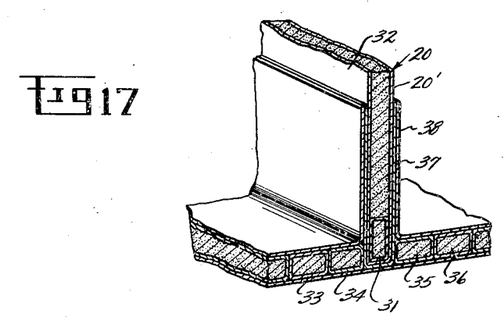

After forming and curing the two complementary shells, the layers of impregnated fabric over the top edge of the metal inserts 80 are cut off by means of a sharp blade 82 in the manner shown in Fig. 16, to leave a deep channel for reception of spar webs after removal of the metal inserts. If desired the inner skin of each shell may be laid down in sections between the fabric covered metal inserts, and the marginal edges of the skin sections are then brought up against the sides of the wrapped metal inserts to form part of the channel thickness. With this arrangement of the inner skin the assembly is simplified, and also the cutting step to free the metal inserts need only apply to the fabric wrapped around the inserts.

To assemble the cured shells into a hollow wing, the spar webs in a preformed and thermoset condition are inserted into the web supporting channels of one wing shell after the liberal application of resinous adhesive thereto. The shells are now brought together at the leading edge portions, which have been coated heavily with resinous adhesive, and using these portions (Fig. 13) as a fulcrum the upper shell is lowered onto the lower shell, as shown in Fig. 3, until the spar webs are made secure in the supporting channels. The leading edge is then smoothed down and the fairing sheet 24 is also secured at both its edges by resin. Numerous transverse clamps are then applied to the wing and brought to bear mostly over the spars. The whole assembly held together by clamps is then cured in an oven at proper temperature to harden the resinous adhesive. If desired a flexible sheet of metal may also be strapped in place around the leading edge to hold the leading edge joint in tight condition while curing.

The wing constructed in the manner above outlined possesses marked advantages over other types of construction. It has superior strength and durability as compared to a veneer or plywood construction and is tougher than the average all metal wing. Unlike metal structures the present plastic bonded wing is not subject to corrosion, and resonant effects due to vibration. Furthermore since it is not affected by vibration the chances of fatigue failure are greatly lessened in the present structure. Properly fabricated, the present wing is capable of withstanding high wing loading, is resistant to shock and is not subject to deterioration under dampness, heat, salt air or by contact with petroleum derivatives. The composite plastic bonded structure disclosed has a very low index of expansion and therefore large variations in temperature do not set up internal stresses.

In manufacturing the wing it is generally preferred that the wing shells each be preformed and cured before being assembled for final bonding into a complete hollow wing. However in some cases it may be desirable, especially in larger wing sizes, to make the complete assembly of wing shells, shell reinforcing ribs, spar supporting channels and to also assemble the shells in final connected relation with the spar webs in place before applying curing heat and pressure. In so assembling the shells, the molds used in laying up the various elements of each shell may be joined together at their edges with the two shells thus brought into assembled relation. To apply molding pressure to the wing shells the spaces interiorly of the wing should be provided with air filled bladders, the pressure of which may be controlled by air conduits passing into the wing interior from one or both ends of the wing. Assembling and bonding the whole wing at one time tends to produce a stronger and more coherent structure, and also avoids separate curing steps for the shells and subsequently for the assembled wing.

While the chordwise shell stiffening members are termed "ribs" in the detailed description, it is to be understood that these elements differ from the customary wing ribs in that they do not form webs extending from one shell to the other. These ribs are applied in the present double walled structure only to stiffen the wing shells and to hold the shells in correct airfoil shape.

The present invention has been described in conjunction with an aircraft wing of the monocoque type, but it is obvious that the same principles of construction may be applied to other hollow aircraft structures such as elevators, stabilizers, control surfaces and also for the aircraft fuselage. In the latter instance the fuselage is made from two similar complementary shells coextensive in length with the finished fuselage each built up of laminated material assembled and molded according to the procedure previously set out in detail. A series of shell reinforcing rings are provided in arcuate sections and are secured to the similar shells in the same manner as the wing ribs previously described. Similarly a series of fuselage stringers are supported and secured inside each shell portion by means of web supporting channels, as described above for holding the wing spar webs in connection with the spar flanges. The two completed shells are then combined to produce the fuselage by joining stringers situated along the shell edges. These adjacent stringers may be bolted together, in addition to the use of resin adhesive at the joint.

The shell construction as disclosed for use in making the complementary shells or as described in conjunction with Fig. 14 is adapted for use in aircraft or other structures where a high strength light weight panel, wall, floor or other surface-forming member is to be provided. The wrapped core elements of rectangular cross section bonded to resin impregnated laminated fabric skins provide opposite sets of parallel faces. One set of faces of each core element are bonded to the spaced fabric skins to form flange-like attaching means, while the other set of faces are bonded to similar contiguous faces of adjacent core elements to form a plurality of webs extending between the fabric skins and lying normal thereto. Thus the core elements form box sections of a length coextensive with the skins and secured both to the skins and to each other.

The embodiments of the invention herein shown and described are to be regarded as illustrative only and it is to be understood that the invention is susceptible to variations, modifications and changes within the scope of the appended claims.

We claim:

1. In an airplane wing construction of airfoil cross section having complementary upper and lower surfaces, and having spar members running spanwise of the wing with rib members extending transversely thereof; the improvement in which said upper and lower surfaces form a unitary double walled monocoque shell having the inner and outer walls thereof formed of a plurality of layers of fabric impregnated with a thermosetting resin and bonded to each other and to a low density core material, said spar members having the flanges thereof bonded to the outer walls of the shell and the inner walls of the shell having integral upstanding web portions bonded to the webs of the spars.

2. The structure as claimed in claim 1, in which the rib members have intercostal flange elements bonded to the outer wall of the shell and a portion of the inner wall of the shell forming upstanding web portions bonded to the webs of the ribs.

3. A monocoque shell construction for aircraft comprising, complementary shells each having a core of low density material faced on each side with high strength resin impregnated fabric bonded to the core to form inner and outer walls on each shell, spar members running lengthwise of each shell and having edge flanges bonded to the outer shell walls and to the inner shell walls, and said inner shell walls having integral upstanding web portions bonded to the webs of said spar members.

4. The structure as claimed in claim 3, in which rib members are provided extending between the spar members, said rib members having intercostal flanges bonded to the outer shell wall and to the inner shell wall, and portions of said inner shell wall forming upstanding web portions bonded to the webs of the ribs.

5. A monocoque aircraft wing construction comprising complementary load carrying shell portions forming the upper and lower surfaces of the wing, each of said shell portions including a central core member of low density material faced on each side with a plurality of layers of high strength fabric impregnated and bonded to each other and to the core with a thermosetting resin, and stiffening elements in each shell comprising strips of core material rectangular in cross section covered throughout their length with a plurality of layers of high strength synthetic resin impregnated fabric and bonded on opposite sides to the facings of the shell and the other sides extending substantially normal to the facings of the shell to function as bracing struts.

6. The structure as claimed in claim 5, in which a plurality of said stiffening elements are arranged in parallel relation extending spanwise of the wing in each of said shell portions to resist bending moments and certain of said last named elements extending from the root substantially to the tip section of the wing and others of said stiffening elements extending spanwise only in the regions subjected to high bending moments.

7. The structure as claimed in claim 5, in which certain of said stiffening elements extend generally spanwise of the wing in each of said shell elements and other of said stiffening elements extend chordwise of the wing, and interconnected shear webs extending spanwise and chordwise of the wing and bonded to said stiffening elements to brace the shell structure against shear and torsional deflections.

8. The structure as claimed in claim 5, in which a pair of said stiffening elements are disposed in parallel planes in said shell members in spaced relation, a channel member having upstanding leg portions positioned in the space between each of said spaced pairs of elements with the bottom of the channel bonded to the outer facing of the shell and the legs of the channel extending beyond the plane of the inner facing of the shell and the inner facing of the shell having upstanding web portions bonded to the legs of the channel to form integral parts thereof, and a shear web positioned within said channels and extending therebetween and bonded to the sides and bottoms of said channels.

9. The structure as claimed in claim 5, in which certain of said stiffening elements are arranged in related pairs in each of said shell portions, the elements of each pair being spaced apart to receive a stiffening channel member of resin impregnated fabric and bonded to the facing material and to the sides of the stiffening elements and the channel having the leg portions thereof extending beyond the plane of the inner facing material and the latter having upstanding web portions bonded to the legs of the channel to form an integral part thereof, and stiffening webs secured in the channels.

10. A stressed skin construction for aircraft comprising a panel having a core of low density material and high strength facing plies on opposite sides of the core, the facing material comprising a plurality of layers of high strength fabric impregnated and bonded to each other and to the core with a thermosetting synthetic resin adhesive and means for stiffening the panel against forces acting normal to the facing including a plurality of webs of resin impregnated fabric extending between the facing plies and having flange portions bonded to the respective facing plies and the webs being bonded to the core material.

11. In a monocoque shell construction for aircraft including complementary shell portions each comprising a core member of low density material faced on each side with high strength fabric material impregnated with resin and bonded to the core, the improved connection between said complementary shell portions comprising a stiffening element bonded to the core material at a terminal edge thereof and the facing material on each shell covering the exposed portions of the stiffening elements associated therewith and the facing material on each shell being bonded together to form a flap extending beyond the stiffening element, the flap on one shell being substantially in the plane of the facing material on the outer surface thereof and the flap on the other shell portion being substantially in the plane of the facing material on the inner side thereof, said shells being arranged with the said stiffening elements in parallel abutting relation and adhesively secured together and the flaps on each shell portion being bonded to the facing material on the opposite shell.

12. In a monocoque wing construction for aircraft including complementary shell portions each comprising a core faced on each side with high strength resin impregnated fabric bonded to the core to form inner and outer walls on each shell, the improvement comprising a plurality of stiffening elements extending spanwise of the wing and forming the portion of said core in the region of the wing root, each of said elements comprising a strip of low density material covered with high strength resin impregnated fabric, portions of said elements being hollowed out at the root end of said wing, the outer walls of each shell and the contiguous portions of the high strength fabric of said stiffening elements being apertured adjacent said wing root to receive fastening elements for mounting said wing on the aircraft.

13. A method of making a monocoque stressed skin shell section for aircraft comprising the steps of providing a mold corresponding to the desired external contour of the shell, laying up a plurality of layers of synthetic resin coated fabric on the mold surface to form an outer face, wrapping strips of low density core material with resin coated fabric to form stiffening elements with certain of said stiffening elements being arranged in parallel spaced relation to form flange members, covering insert forms with resin coated fabric and positioning the same in the space between said flange members, applying a low density core material to the uncovered portions of the material of the outer face, applying an inner skin of a plurality of layers of synthetic resin coated high strength fabric over the core material, stiffening elements and insert forms, applying curing heat and pressure to the assembly and trimming the molded material from the tops of the inserts to permit the removal of the same.

14. A method of constructing a composite braced structural shell for aircraft consisting of providing a mold having a surface conforming to the contour of one of the surfaces of the shell, laying thermosetting synthetic resin coated layers of fabric on the mold surface with the number of layers decreasing from a maximum to a minimum along one axis of the shell to form a shell face, applying a plurality of stiffener elements covered with synthetic resin coated fabric to the shell face in parallel abutting relation, certain of said stiffener elements extending beyond the plane of the other of said elements to form webs, applying low density core material to the shell face over the areas not in contact with the stiffener elements, draping a plurality of layers of synthetic resin coated fabric over the assembly to form an inner shell face and applying pressure to the last named layers of fabric to bring them into intimate contact with all of the exposed portions of the stiffener elements, webs and core material, and heating the assembly while under pressure to a curing temperature.

15. A method of making a monocoque wing including complementary wing shells connected to form the completed wing, said method comprising the steps of providing a mold for each shell, laying up a plurality of layers of resin impregnated fabric on the mold surfaces to form outer shell skins, wrapping strips of low density core material with resin impregnated fabric to form shell stiffening elements and placing said elements in contact with said outer shell skins with certain of said stiffening elements being arranged in parallel spaced relation, covering insert forms with resin impregnated fabric and placing the same between said spaced stiffening elements, applying a low density core material to the uncovered portions of the outer shell skins, applying inner shell skins comprising a plurality of layers of resin impregnated fabric over the core material, stiffening elements and insert forms, applying curing heat and pressure to each complementary wing shell, trimming the fabric from the tops of the insert forms to permit removal of the same, inserting resin coated spar webs into the spaces of each shell vacated by the insert forms to connect the shells thereby, providing an adhesive joint at the leading edge portions of the shells, and applying curing heat and pressure to the assembled shells.

16. A monocoque aircraft wing comprising a pair of complementary wing shells connected adjacent the leading and trailing edges, each shell having an inner and an outer resin impregnated fabric skin bonded to a core layer, each core layer comprising a plurality of low density strip-like core elements in side-by-side relation, at least several of said core elements being covered throughout their length with resin impregnated fabric, one covered core element of each shell forming and defining the leading edge portion thereof, the inner and outer skins of each shell being bonded together beyond the respective leading edge core elements to form double layers of fabric, and the double layers of each wing shell being bonded to one skin surface of the other wing shell.

17. In an airplane wing construction of airfoil cross section having complementary upper and lower surface-forming members, a wing spar member running spanwise of the wing and comprising upper and lower flange portions attached to the respective upper and lower surface-forming members of the wing, an upstanding web portion coextensive in length with respect to said flange portions and connected to said flange portions intermediate of the width thereof, said flange and web portions each including a plurality of strips of low density material covered throughout their length and circumference with a plurality of layers of high strength resin impregnated textile fabric to form core elements fixed in side-by-side contacting resin-bonded relation, and means attaching said flange portions to said web portion comprising a plurality of layers of high strength resin impregnated textile fabric bonded by a resinous material to the covering fabric of the core elements of said flange and web portions.

18. In an airplane wing, a wing spar construction comprising upper and lower spaced flange portions, an upstanding web portion coextensive in length with respect to said flange portions and connected to said flange portions intermediate of the width thereof, said flange and web portions each including a plurality of low density strips of rectangular cross section covered throughout their length and circumference with a plurality of layers of high strength resin impregnated textile fabric to form core elements fixed in side-by-side contacting resin-bonded relation, facing sheets comprising a plurality of layers of high strength resin impregnated textile fabric bonded to the inner and outer parallel faces of said flange portions, and means attaching said flange portions to said web portion including upstanding extensions of the facing sheets adjacent to said web portion bonded by a resinous material to the covering fabric of the core elements of said web portion.

GEORGE B. RHEINFRANK, JR.
WAYNE A. NORMAN.

REFERENCES CITED

The following references are of record in the file of this patent:

UNITED STATES PATENTS

| Number | Name | Date |
| --- | --- | --- |
| 225,767 | Smith | Mar. 23, 1880 |
| 1,428,714 | Schwamb et al. | Sept. 12, 1922 |
| 1,429,600 | Lundin | Sept. 19, 1922 |
| 1,842,736 | Stout | Jan. 26, 1932 |
| 2,029,048 | Atwood | Jan. 28, 1936 |
| 2,029,214 | Atwood | Jan. 28, 1936 |
| 2,243,432 | Moutner | May 27, 1941 |
| 2,258,134 | Clark | Oct. 7, 1941 |
| 2,273,919 | Allward | Feb. 24, 1942 |
| 2,315,324 | Gassner | Mar. 30, 1943 |
| 2,348,316 | Vidal et al. | May 9, 1944 |
| 2,369,006 | Banks | Feb. 6, 1945 |
| 2,376,653 | Boyer | May 22, 1945 |
| 2,377,846 | Dreyfus et al. | June 5, 1945 |
| 2,445,290 | Gonda | July 13, 1948 |

FOREIGN PATENTS

| Number | Country | Date |
| --- | --- | --- |
| 450,524 | Great Britain | Apr. 23, 1935 |
| 484,305 | Great Britain | May 3, 1938 |
| 519,061 | Great Britain | Mar. 15, 1940 |

OTHER REFERENCES

Ser. No. 212,074, Dornier (A. P. C.) pub. May 11, 1943.

"Modern Plastics" May 1944, pages 89–112, 184.